US012566940B2

(12) United States Patent
Kim et al.

(10) Patent No.: US 12,566,940 B2
(45) Date of Patent: Mar. 3, 2026

(54) METHOD AND APPARATUS FOR QUANTIZING PARAMETERS OF NEURAL NETWORK

(71) Applicant: SAMSUNG ELECTRONICS CO., LTD., Suwon-si (KR)

(72) Inventors: Gunhee Kim, Seoul (KR); Seungwon Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1257 days.

(21) Appl. No.: 17/192,048

(22) Filed: Mar. 4, 2021

(65) Prior Publication Data

US 2022/0092384 A1 Mar. 24, 2022

(30) Foreign Application Priority Data

Sep. 23, 2020 (KR) ........................ 10-2020-0123172

(51) Int. Cl.
*G06N 3/063* (2023.01)
*G06N 3/04* (2023.01)

(52) U.S. Cl.
CPC ...................................... *G06N 3/04* (2013.01)

(58) Field of Classification Search
CPC .......... G06N 3/04; G06N 3/045; G06N 3/063; G06N 3/08; G06N 3/0495; G06N 5/04; G06F 7/483; G06F 2207/3824
See application file for complete search history.

(56) References Cited

U.S. PATENT DOCUMENTS

| | | | |
|---|---|---|---|
| 8,301,576 B2 | 10/2012 | Meng et al. | |
| 9,710,265 B1 | 7/2017 | Temam et al. | |
| 10,007,876 B1 | 6/2018 | Young | |
| 10,096,134 B2 | 10/2018 | Yan et al. | |
| 10,373,050 B2 | 8/2019 | Lin et al. | |
| 11,520,561 B1 * | 12/2022 | Afzal | G06F 7/57 |
| 11,861,492 B1 * | 1/2024 | Hsu | G06N 3/0495 |
| 2012/0330870 A1 | 12/2012 | Aparin | |

(Continued)

FOREIGN PATENT DOCUMENTS

| | | |
|---|---|---|
| CN | 108432249 A | 8/2018 |
| CN | 109800865 A | 5/2019 |

(Continued)

OTHER PUBLICATIONS

De Prado, Miguel, et al., "QUENN: Quantization Engine for low-power Neural Networks", Proceedings of the 15th ACM International Conference on Computing Frontiers. arXiv;1811.05896v1 [cs.NE], Nov. 14, 2018. (9 pages in English).

(Continued)

*Primary Examiner* — Hien L Duong
(74) *Attorney, Agent, or Firm* — NSIP Law

(57) ABSTRACT

A method of quantizing parameters of a neural network includes acquiring a parameter of a floating-point format used in a process of inferring by the neural network, quantizing, based on statistics of a weight included in the parameter, the weight into a fixed-point format, determining, based on statistics of an activation of one or more layers configuring the neural network included in the parameter, a (Continued)

dynamic range of the activation, and quantizing, based on statistics of input data of the neural network, the input data into a fixed-point format.

13 Claims, 9 Drawing Sheets

(56) References Cited

U.S. PATENT DOCUMENTS

| 2015/0256840 | A1* | 9/2015 | Sato | H04N 19/46 |
| | | | | 375/240.03 |
| 2016/0328646 | A1 | 11/2016 | Lin et al. | |
| 2016/0328647 | A1 | 11/2016 | Lin et al. | |
| 2017/0193361 | A1 | 7/2017 | Chilimbi et al. | |
| 2019/0034784 | A1* | 1/2019 | Li | G06N 3/0495 |
| 2019/0034796 | A1* | 1/2019 | Li | G06N 3/09 |
| 2019/0042948 | A1* | 2/2019 | Lee | G06N 3/063 |
| 2019/0138882 | A1* | 5/2019 | Choi | G06N 3/048 |
| 2019/0251436 | A1 | 8/2019 | Son et al. | |
| 2019/0279072 | A1 | 9/2019 | Gao et al. | |
| 2020/0082269 | A1* | 3/2020 | Gao | G06F 7/483 |
| 2021/0034955 | A1* | 2/2021 | Sather | G06N 3/048 |
| 2021/0150334 | A1* | 5/2021 | Wolfe | G06F 17/14 |
| 2021/0174172 | A1* | 6/2021 | Qadeer | G06N 3/0495 |
| 2021/0224069 | A1* | 7/2021 | Chen | G06F 9/3001 |
| 2021/0255860 | A1* | 8/2021 | Morrison | G06F 9/3887 |
| 2021/0279574 | A1* | 9/2021 | Liu | G06N 3/0464 |
| 2021/0279635 | A1* | 9/2021 | Gadelrab | G06N 5/04 |
| 2021/0294874 | A1* | 9/2021 | Tang | G11C 11/54 |
| 2021/0312328 | A1* | 10/2021 | Danjo | G06F 17/16 |
| 2022/0044114 | A1* | 2/2022 | Sriram | G06N 3/045 |
| 2022/0067527 | A1* | 3/2022 | Xu | G06N 3/048 |
| 2023/0118802 | A1* | 4/2023 | Gong | G06N 3/0495 |
| | | | | 706/25 |

FOREIGN PATENT DOCUMENTS

| CN | 110413255 | A | 11/2019 |
| CN | 111178514 | A | 5/2020 |
| KR | 10-2018-0120967 | A | 11/2018 |
| KR | 10-2019-0014900 | A | 2/2019 |
| KR | 10-2019-0034985 | A | 4/2019 |
| KR | 10-2019-0043849 | A | 4/2019 |
| KR | 10-2019-0044878 | A | 5/2019 |
| KR | 10-2019-0050141 | A | 5/2019 |
| KR | 10-2019-0054454 | A | 5/2019 |
| KR | 10-2019-0068255 | A | 6/2019 |
| KR | 10-2019-0125141 | A | 11/2019 |
| KR | 10-2019-0130443 | A | 11/2019 |
| KR | 10-2020-0004700 | A | 1/2020 |

OTHER PUBLICATIONS

Tambe, Thierry, et al., "Algorithm-Hardware Co-Design of Adaptive Floating-Point Encodings for Resilient Deep Learning Inference", 2020 57th ACM/IEEE Design Automation Conference (DAC). IEEE, 2020. (6 pages in English).

Oh, Jihun, et al., "Weight Equalizing Shift Scaler-Coupled Post-training Quantization", arXiv preprint arXiv:2008.05767 Aug. 13, 2020 (9 pages in English).

Extended European search report issued on Apr. 11, 2022, in counterpart European Patent Application No. 21185895.6 (11 pages in English).

Chinese Office Action issued on Dec. 10, 2025, in counterpart Chinese Patent Application No. 202110266381.8 (31 pages in English, 15 pages in Chinese).

* cited by examiner

Weight/activation of floating-point format  ⟋610

Calculating/inferring Lp norm  ⟋620

Determining dynamic range  ⟋630

Quantization  ⟋640

Weight/activation of fixed-point format  ⟋650

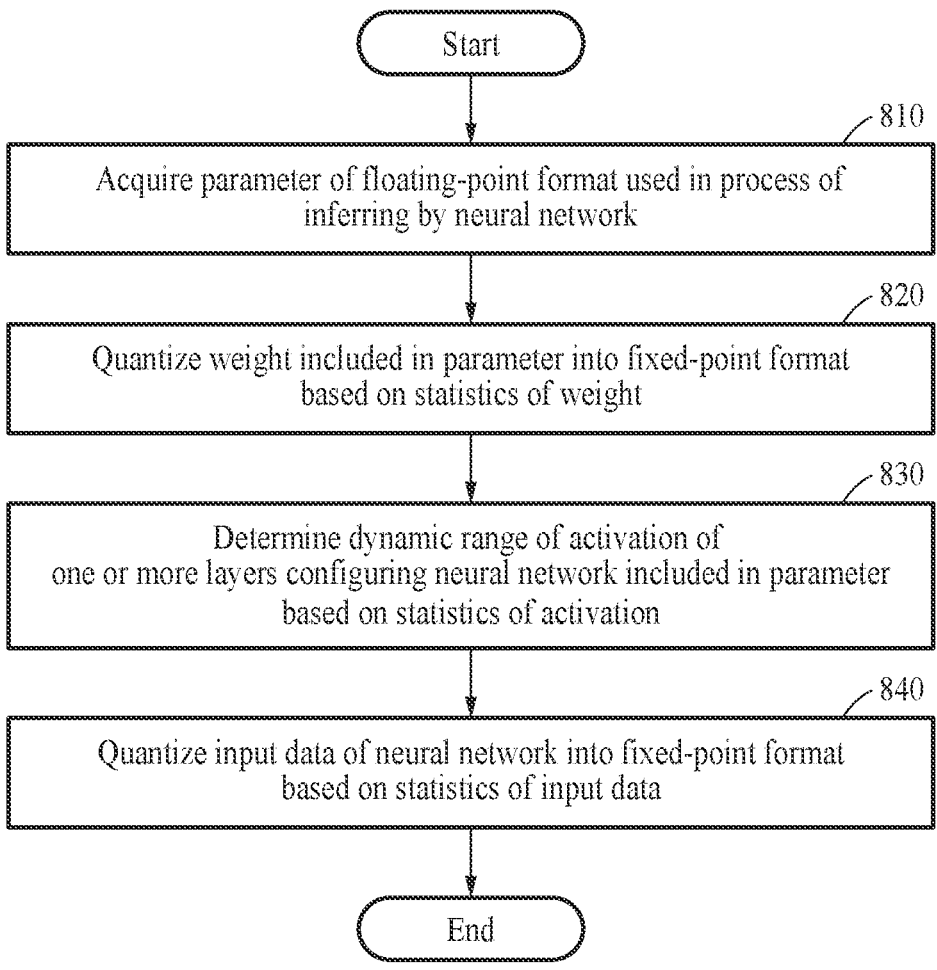

Start

810

Acquire parameter of floating-point format used in process of inferring by neural network

820

Quantize weight included in parameter into fixed-point format based on statistics of weight

830

Determine dynamic range of activation of one or more layers configuring neural network included in parameter based on statistics of activation

840

Quantize input data of neural network into fixed-point format based on statistics of input data End

FIG. 8

Start

910

Acquire parameter of floating-point format used in process of inferring by neural network

920

Calculate Lp norm of weight included in parameter

930

Infer Lp norm of output activation of one or more layers configuring neural network included in parameter

940

Calculate Lp norm of input data of neural network

End

1

METHOD AND APPARATUS FOR QUANTIZING PARAMETERS OF NEURAL NETWORK

CROSS-REFERENCE TO RELATED APPLICATIONS

This application claims the benefit under 35 USC § 119(a) of Korean Patent Application No. 10-2020-0123172, filed on Sep. 23, 2020, in the Korean Intellectual Property Office, the entire disclosure of which is incorporated herein by reference for all purposes.

BACKGROUND

1. Field

The following description relates to a method and apparatus for quantizing parameters of a neural network.

2. Description of Related Art

In order to solve an issue of classifying an input pattern into a specific group, studies have been actively made to apply an effective pattern recognition method of a human being to a real computer. One of the studies is about an artificial neural network modeled by mathematical expressions of the characteristics of human biological neurons. To solve the issue of classifying the input patterns into the specific group, the artificial neural networks uses an algorithm that mimics an ability of human learning. Based on the algorithm, the artificial neural network may generate a mapping between input and output patterns, and an ability to generate the mapping is expressed as a learning ability of the artificial neural network. Also, the artificial neural network has a generalization ability to generate a relatively correct output for an input pattern that has not been used for learning based on a learned result.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of quantizing parameters of a neural network includes acquiring a parameter of a floating-point format used in a process of inferring by the neural network, quantizing, based on statistics of a weight included in the parameter, the weight into a fixed-point format, determining, based on statistics of an activation of one or more layers configuring the neural network included in the parameter, a dynamic range of the activation, and quantizing, based on statistics of input data of the neural network, the input data into a fixed-point format.

The method may further include inputting the quantized input data to the neural network, performing an operation between a quantized input activation of a current layer of the neural network and a quantized weight of the current layer and generating an output activation of the current layer, and quantizing the output activation of the current layer based on the dynamic range of the activation.

The quantizing of the weight into the fixed-point format may include calculating an Lp norm of the weight, determining a dynamic range of the weight based on the Lp norm of the weight, and quantizing the weight into the fixed-point format based on the dynamic range of the weight.

The determining of the dynamic range of the activation may include calculating a relational expression between an Lp norm of an output activation and an Lp norm of an input activation of the layers based on the parameter, and inferring an Lp norm of an output activation of the layers based on the relational expression and an Lp norm of an output activation of a previous layer of the layers.

The determining of the dynamic range of the activation may include determining a dynamic range of the output activation of the layers based on the Lp norm of the output activation of the layers.

The determining of the dynamic range of the activation may include classifying the layers into a first layer including a normalization layer and a second layer that does not include the normalization layer, inferring an Lp norm of an output activation of the first layer based on a normalization parameter of the first layer included in the parameter, and inferring an Lp norm of an output activation of the second layer based on the parameter and the Lp norm of the output activation of the first layer.

The inferring of the Lp norm of the output activation of the second layer may include calculating a relational expression between an Lp norm of an input activation and an Lp norm of the output activation of the second layer based on the parameter, determining the Lp norm of the input activation of the second layer based on the Lp norm of the output activation of the first layer, and inferring the Lp norm of the output activation of the second layer based on the Lp norm of the input activation of the second layer and the relational expression.

The determining of the dynamic range of the activation may include determining a dynamic range of the output activation of the first layer based on the Lp norm of the output activation of the first layer, and determining a dynamic range of the output activation of the second layer based on the Lp norm of the output activation of the second layer.

In another general aspect, a method of quantizing parameters of a neural network includes acquiring a parameter of a floating-point format used in a process of inferring by the neural network, calculating an Lp norm of a weight included in the parameter, inferring an Lp norm of an output activation of one or more layers configuring the neural network included in the parameter, and calculating an Lp norm of input data of the neural network.

The method may further include determining a dynamic range of the weight based on the Lp norm of the weight, quantizing the weight into a fixed-point format based on the dynamic range of the weight, determining a dynamic range of the output activation of the layers based on the Lp norm of the output activation of the layers, determining a dynamic range of the input data based on the Lp norm of the input data, and quantizing the input data into a fixed-point formal based on the dynamic range of the input data.

The method may further include inputting the quantized input data to the neural network, performing an operation between a quantized input activation of a current layer of the neural network and a quantized weight of the current layer and generating an output activation of the current layer, and quantizing the output activation of the current layer based on the dynamic range of the activation.

The calculating of the Lp norm of the output activation may include calculating a relational expression between the Lp norm of an output activation and the Lp norm of an input activation of the layers based on the parameter, and inferring the Lp norm of an output activation of the layers based on the relational expression and an Lp norm of an output activation of a previous layer of the layers.

In another general aspect, a neural network apparatus for quantizing parameters of a neural network includes a processor configured to acquire a parameter of a floating-point format used in a process of inferring by the neural network, quantize, based on statistics of a weight included in the parameter, the weight into a fixed-point format, determine, based on statistics of an activation of one or more layers configuring the neural network included in the parameter, a dynamic range of the activation, and quantize, based on statistics of input data of the neural network, the input data into a fixed-point format.

The processor may be configured to calculate an Lp norm of the weight, determine a dynamic range of the weight based on the Lp norm of the weight, and quantize the weight into the fixed-point format based on the dynamic range of the weight.

The processor may be configured to calculate a relational expression between an Lp norm of an output activation and an Lp norm of an input activation of the layers based on the parameter, and infer an Lp norm of an output activation of the layers based on the relational expression and an Lp norm of an output activation of a previous layer of the layers.

The processor may be configured to determine a dynamic range of the output activation of the layers based on the Lp norm of the output activation of the layers.

The processor may be configured to classify the layers into a first layer including a normalization layer and a second layer that does not include the normalization layer, infer an Lp norm of an output activation of the first layer based on a normalization parameter of the first layer included in the parameter, and infer an Lp norm of an output activation of the second layer based on the parameter and the Lp norm of the output activation of the first layer.

The processor may be configured to calculate a relational expression between an Lp norm of an input activation and an Lp norm of the output activation of the second layer based on the parameter, determine the Lp norm of the input activation of the second layer based on the Lp norm of the output activation of the first layer, and infer an Lp norm of the output activation of the second layer based on the Lp norm of the input activation of the second layer and the relational expression.

The processor may be configured to determine a dynamic range of the output activation of the first layer based on the Lp norm of the output activation of the first layer and determine a dynamic range of the output activation of the second layer based on the Lp norm of the output activation of the second layer.

In another general aspect, a neural network quantization apparatus for quantizing parameters of a neural network includes a processor configured to acquire a parameter of a floating-point format used in a process of inferring by the neural network, calculate an Lp norm of a weight included in the parameter, infer an Lp norm of an output activation of one or more layers configuring the neural network included in the parameter, and calculate an Lp norm of input data of the neural network.

The processor may be configured to calculate a relational expression between an Lp norm of an output activation and an Lp norm of an input activation of the layers based on the parameter, and infer an Lp norm of an output activation of the layers based on the relational expression and an Lp norm of an output activation of a previous layer of the layers.

In another general aspect, a neural processing unit (NPU) includes a memory including an Lp norm of a weight, an Lp norm of an output activation of layers, and an Lp norm of input data, and a neural network quantization apparatus that determines a dynamic range of the weight based on the Lp norm of the weight, quantizes the weight into a fixed-point format based on the dynamic range of the weight, determines a dynamic range of the output activation of the layers based on the Lp norm of the output activation of the layers, determines a dynamic range of the input data based on the Lp norm of the input data, and quantizes the input data into a fixed-point format based on the dynamic range of the input data.

The NPU may further include an arithmetic logic unit (ALU) configured to perform an operation between a quantized input activation of a current layer of the neural network and a quantized weight of the current layer and generate an output activation of the current layer, wherein the neural network quantization apparatus may quantize the output activation of the current layer based on the dynamic range of the output activation.

In another general aspect, a neural network inferring apparatus includes a memory including a parameter of a floating-point format used in a process of inferring by a neural network, a neural network quantization apparatus that acquires a parameter from the memory, quantizes, based on statistics of a weight included in the parameter, the weight into a fixed-point format, determines, based on statistics of an activation of one or more layers configuring the neural network included in the parameter, a dynamic range of the activation, and quantizes, based on statistics of input data of the neural network, the input data into a fixed-point format, and an NPU configured to perform inference by receiving the quantized weight, the dynamic range of the activation, and the quantized input data from the neural network quantization apparatus.

The NPU may be configured to perform an operation between a quantized input activation of a current layer of the neural network and a quantized weight of the current layer, generate an output activation of the current layer, and quantize the output activation of the current layer based on the dynamic range of the activation.

In another general aspect, a processor-implemented method includes acquiring a parameter of a floating-point neural network model; calculating an Lp norm of a weight included in the parameter; deriving a relational expression between an Lp norm of an output activation and an Lp norm of an input activation of the floating-point neural network model based on the Lp norm of the weight; calculating a predicted value of the Lp norm of the output activation based on the Lp norm of the input activation; determining, based on the predicted value, a dynamic range of an activation of the floating-point neural network model; and quantizing the floating-point neural network model into a fixed-point neural network model based on the dynamic range.

The output activation may be an output activation of a convolutional layer including a normalization layer.

The Lp norm may include an L2 norm.

Other features and aspects will be apparent from the following detailed description, the drawings, and the claims.

BRIEF DESCRIPTION OF THE DRAWINGS

FIG. 8 is a flowchart illustrating an example of a quantization method.

Figure 1:
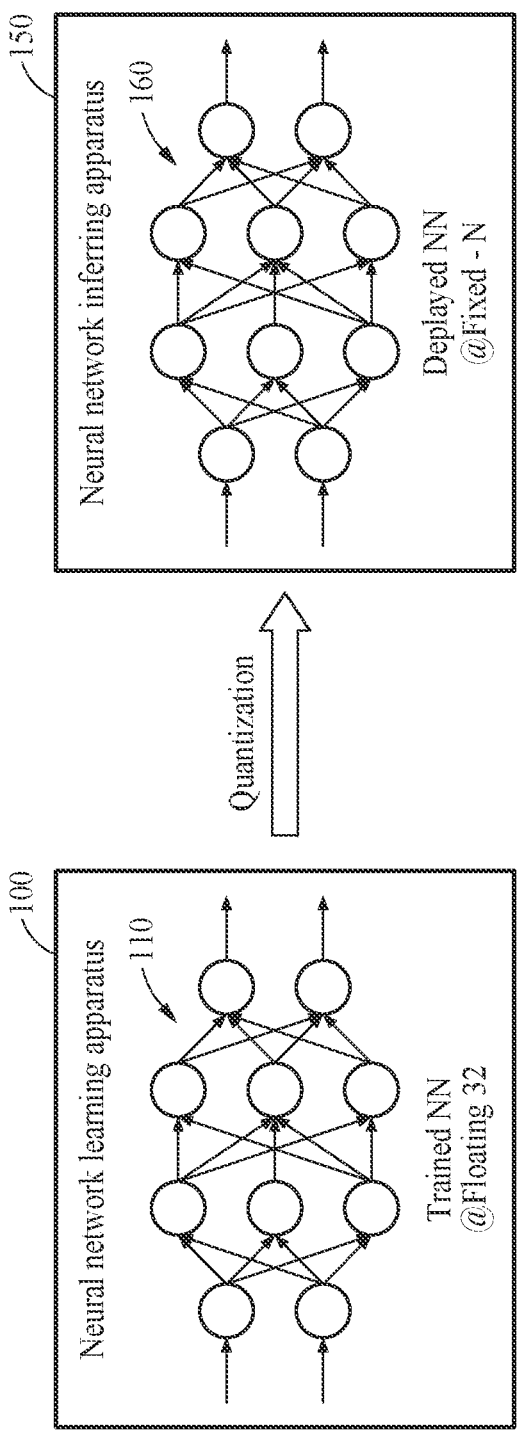
FIG. 1 is a diagram illustrating an example of quantizing a parameter of a floating-point format to a parameter of a fixed-point format in a neural network.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions of examples disclosed in the present disclosure are merely intended for the purpose of describing the examples and the examples may be implemented in various forms. The examples are not meant to be limited, but it is intended that various modifications, equivalents, and alternatives are also covered within the scope of the claims.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the singular forms "a", "an", and "the" are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined, all terms including technical or scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Examples may be implemented as various types of products such as a data center, a personal computer (PC), a laptop computer, a tablet computer, a smartphone, a television, a smart home device, an intelligent vehicle, a kiosk, and a wearable device. Hereinafter, examples will be described in detail with reference to the accompanying drawings, and like reference numerals in the drawings refer to like elements throughout.

FIG. 1 is a diagram illustrating an example of quantizing a parameter of a floating-point format into a parameter of a fixed-point format in a neural network.

Referring to FIG. 1, a neural network learning apparatus 100 corresponds to a computing device having various processing functions, such as a function of generating a neural network, training or learning a neural network, and a function retraining a neural network. The neural network learning apparatus 100 may be implemented as various types of devices such as a PC, a server device, a mobile device, and the like, for example.

The neural network learning apparatus 100 may generate a trained neural network 110 by repetitively training or learning a given initial neural network. The initial neural network may have parameters of a floating-point format, for example, parameters of 32-bit floating-point precision in order to secure a processing accuracy of the neural network. Here, the parameters may include various types of data input to or output from a neural network, such as input/output activations, weights, and biases of the neural network, for example. As the repetitive training of the neural network progresses, the floating-point parameters of the neural network may be tuned to compute a more accurate output for a given input.

The neural network learning apparatus 100 may transfer the trained neural network 110 to a neural network inferring apparatus 150. The neural network inferring apparatus 150 may be included in, for example, a mobile device and an embedded device. The neural network inferring apparatus 150 is dedicated hardware for driving a neural network and implemented with relatively low power and low performance. Thus, the network inferring apparatus 150 may be implemented to be more suitable for a fixed-point operation rather than a floating-point operation.

The neural network inferring apparatus 150 that drives a quantized neural network 160 may be implemented in a separate device independent of the neural network learning apparatus 100. However, it is merely an example, and the neural network inferring apparatus 150 may be implemented in the same device as the neural network learning apparatus 100.

Meanwhile, the floating-point requires a relatively large amount of computation and a high memory access frequency compared to the fixed-point. In particular, it is known that most of the amount of computation required for processing the neural network is a multiplication and accumulation (MAC) operation in which operations of various parameters are performed. Accordingly, the neural network inferring apparatus 150 included in a smartphone, a tablet PC, and a wearable device, which have relatively low processing performance, may not smoothly process a neural network having parameters of a floating-point format. Consequently, in order to drive the neural network within an acceptable accuracy loss while sufficiently reducing the amount of computation in such devices, it is desirable that the parameters of the floating-point format processed in the neural network are quantized. Here, parameter quantization refers to converting a parameter of the floating-point format having a high precision into a parameter of the fixed-point format having a low precision. A fixed-point format parameter conversion indicates a process of redefining functions implemented using a decimal as functions related to integer arithmetic, and then integerizing all decimal arithmetic operations of a floating-point source code. If a floating-point variable is multiplied by an appropriate value to make an integer, the integer arithmetic using an integer operator may be performed. A result value may be divided by the above-multiplied value so as to be converted back to the floating-point variable.

A neural network quantization apparatus may perform quantization to convert parameters of the trained neural network 110 into a fixed-point format of predetermined bits. The neural network quantization apparatus may operate in the neural network learning apparatus 100 or the neural network inferring apparatus 150, or operate as an independent third hardware accelerator. The neural network quantization apparatus may perform quantization to convert the parameters of the trained neural network 110 into a fixed-point format of predetermined bits based on processing performance of a device of the neural network inferring apparatus 150 to deploy the neural network, and transfer the quantized neural network 160 to the neural network inferring apparatus 150 to deploy the neural network.

The neural network inferring apparatus 150 in which the quantized neural network 160 is to be deployed may be included in, for example, autonomous vehicles, robotics, smartphones, tablet devices, augmented reality (AR) devices, and Internet of Things (IoT) devices, but not be limited thereto.

Figure 2:
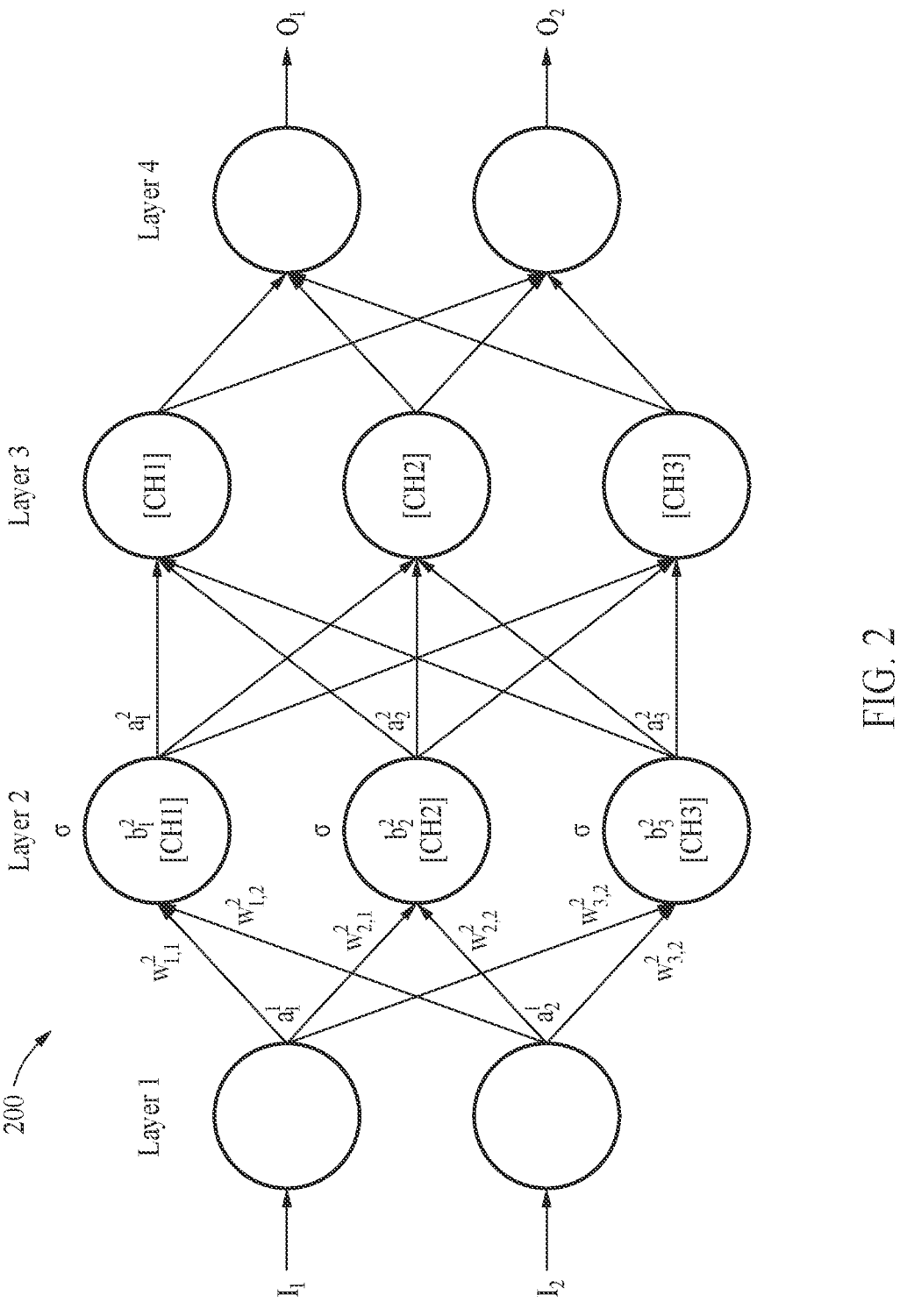
FIG. 2 is a diagram illustrating an example of an operation performed in a neural network.

FIG. 2 is a diagram illustrating an example of an operation performed in a neural network.

Referring to FIG. 2, a neural network 200 has a structure including an input layer, hidden layers, and an output layer. The neural network 200 may perform an operation based on received input data, for example, $I_1$ and $I_2$, and may generate output data, for example, $O_1$ and $O_2$, based on a result of the performed operation.

The neural network 200 may be, as described above, a deep neural network (DNN) or an n-layer neural network including two or more hidden layers. In the example illustrated in FIG. 2, the neural network 200 is a DNN that includes an input layer (Layer 1), two hidden layers (Layer 2 and Layer 3), and an output layer (Layer 4). The DNN may include, for example, convolutional neural networks (CNN), recurrent neural networks (RNN), deep belief networks, and restricted Boltzman machines, but is not limited thereto.

When the neural network 200 is implemented by a DNN architecture, the neural network 200 includes multiple hidden layers for effectively processing information, which enables the neural network 200 to process more complicated data sets than a neural network having a single hidden layer. Although the neural network 200 is illustrated as including four layers, this is merely an example and the neural network 200 may include more or fewer layers, or more or fewer channels. In other words, the neural network 200 may include layers having various structures different from the structure illustrated in FIG. 2.

Each of the layers included in the neural network 200 includes a plurality of channels. The channels correspond to a plurality of artificial nodes which may also be known as neurons, processing elements (PE), units, or terms similar thereto. For example, as illustrated in FIG. 2, Layer 1 includes two channels (nodes), and each of Layer 2 and Layer 3 includes three channels (nodes). However, this is merely an example, and each of the layers included in the neural network 200 may include various numbers of channels (nodes).

The channels in the respective layers of the neural network 200 are connected to each other to process data. For example, one channel may receive data from other channels and perform various operations on the data and may output an operation result to other channels.

The input of each of the channels may be referred to as an input activation, and the output of each of the channels may be referred to as an output activation. In other words, an activation is a parameter that is an output of one channel and is simultaneously an input of one or more channels included in the next layer. Each of the channels may determine its own activation based on the activations, weights, and biases received from channels included in a previous layer. A weight is a parameter used to calculate an output activation in each channel, and is a value allotted to a connection between the channels.

Each of the channels may be processed by a computational unit or a processing element that receives an input and outputs an output activation. The input and the output of each of the channels may be mapped. For example, if $\sigma$ denotes an activation function, $w_{jk}^{i}$ denotes weight from a k-th node included in an (i−1)th layer to a j-th node included in an i-th layer, $b_j^{i}$ denotes a bias of the j-th node included in the i-th layer, and $a_j^{i}$ denotes an activation of the j-th node of the i-th layer, the activation $a_j^{i}$ may be calculated according to Equation 1 below.

$$a_j^i = \sigma\left(\sum_k \left(w_{jk}^i \times a_k^{i-1}\right) + b_j^i\right) \qquad \text{Equation 1}$$

As illustrated in FIG. 2, an activation of a first channel (CH 1) of the second layer (Layer 2) is expressed by $a_1^2$. In addition, $a_1^2$ may have a value of "$a_1^2 = \sigma(w_{1,1}^2 \times a_1^1 + w_{1,2}^2 \times a_2^1 + b_1^2)$" according to Equation 1. However, the above-described Equation 1 is merely an example for explaining the activation, weight, and bias that may be used to process data in the neural network 200, and the example of the neural network of FIG. 2 is not limited thereto. For example, the activation may be a value obtained by allowing a weighted sum of the activations received from the previous layer to pass through an activation function, such as a sigmoid function or a rectified linear unit (ReLU) function.

Figure 3:
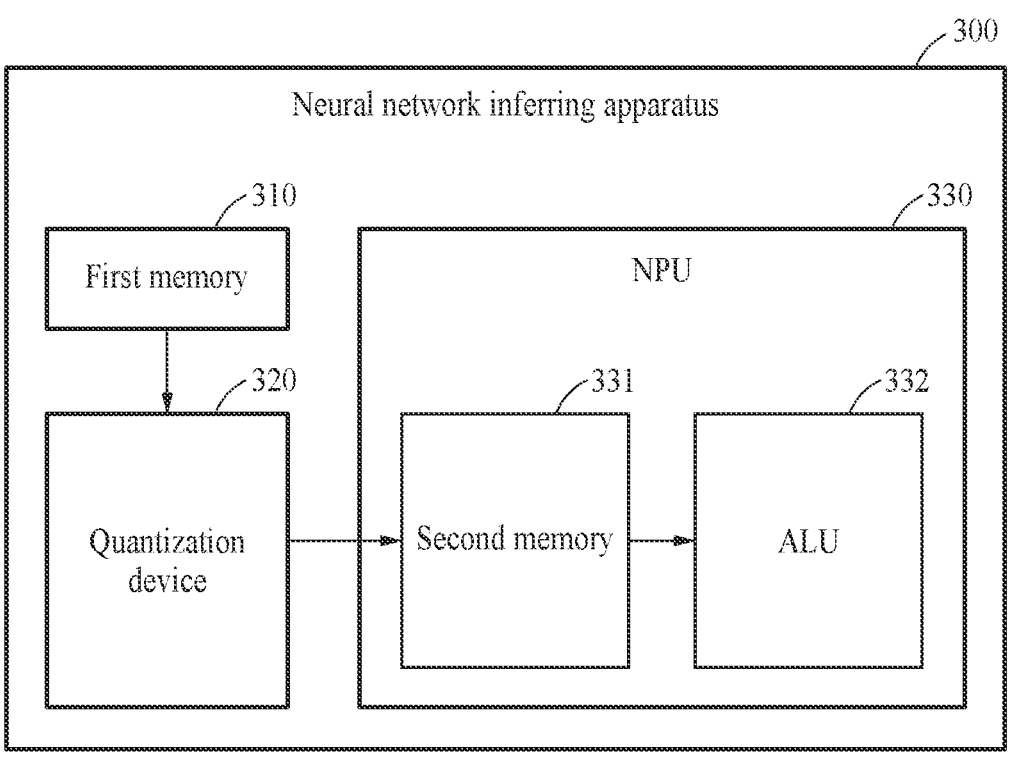
FIG. 3 is a block diagram illustrating an example of a hardware configuration of a neural network inferring apparatus.

FIG. 3 is a block diagram illustrating an example of a hardware configuration of a neural network inferring apparatus.

Referring to FIG. 3, a neural network inferring apparatus 300 may include a first memory 310, a quantization device 320, and a neural processing unit (NPU) 330.

The neural network inferring apparatus 300 may be included in, for example, an embedded device and/or a mobile device such as a smartphone, a tablet PC, and a wearable device, which have relatively low processing performance. Since a floating-point requires a relatively large amount of computation and a high memory access frequency compared to a fixed-point, the neural network inferring apparatus 300 included in the mobile device, the embedded device, or the like may not smoothly process a neural network having parameters of a floating-point format. Therefore, the neural network inferring apparatus 300 may perform inference using a neural network generated in a neural network trainer using parameters of a fixed-point format to which parameters of the floating-point format processed in the neural network are quantized.

For this, instead of receiving the quantized neural network 160 from the separate neural network learning apparatus 100, the neural network inferring apparatus 300 may use the quantization device 320 to receive floating-point format parameters and quantize the floating-point format parameters to fixed-point format parameters.

The quantization device 320 may convert the floating-point format parameter to the fixed-point format parameter based on statistics of parameters without using a separate profile. For example, the quantization device 320 may quantize a 32-bit floating-point to a fixed-point of 16 bits or less.

The first memory 310 is hardware configured to store various pieces of data processed in the neural network inferring apparatus 300 and may store data that has been processed and data that is to be processed in the neural network inferring apparatus 300. For example, the first memory 310 may store data associated with the trained neural network 110. In addition, the first memory 310 may store applications and drivers that are to be executed by the neural network inferring apparatus 300. The first memory 310 may be, but is not limited to, dynamic random-access memory (DRAM).

The quantization device 320 may acquire a parameter of a floating-point format used in a process of inferring by the neural network, the parameter being stored in the first memory 310. For example, the neural network inferring apparatus 300 may use a direct memory access (DMA) controller (not shown) to load the parameter of the floating-point format stored in the first memory 310 to the quantization device 320. The quantization device 320 may determine an appropriate dynamic range to quantize a parameter using statistics of parameters. The dynamic range may refer to a number of bits required to express the parameter. For example, the quantization device 320 may quantize a parameter of a 32-bit floating-point format into a dynamic range of 8 bits. A process of quantizing a floating-point format parameter to a fixed-point format parameter is described below in greater detail with reference to FIGS. 5 through 9.

The NPU 330 may perform inference using a neural network generated in a neural network trainer using parameters quantized in the fixed-point format. An arithmetic logic unit (ALU) 332 may process a convolution operation between a quantized input activation and a weight and apply a convolution operation result to an activation function, thereby generating an output activation. A second memory 331 may store quantized neural network data and a neural network-related data set that is to be processed or has been processed in an inference process. In addition, the second memory 331 may store intermediate values calculated in a process of performing bit manipulation and integer arithmetic operations using the ALU 332.

Figure 4:
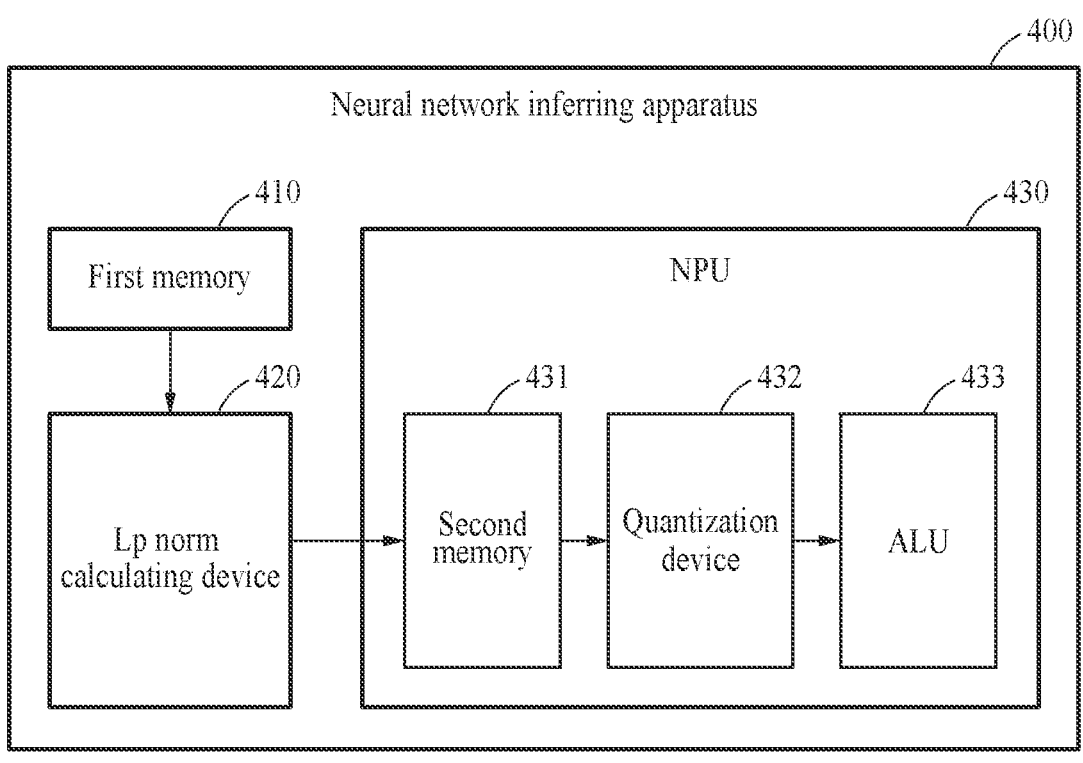
FIG. 4 is a block diagram illustrating another example of a hardware configuration of a neural network inferring apparatus.

FIG. 4 is a block diagram illustrating another example of a hardware configuration of a neural network inferring apparatus.

Referring to FIG. 4, a neural network inferring apparatus 400 may include a first memory 410, an Lp norm calculating device 420, and an NPU 430.

Unlike the neural network inferring apparatus 300 in which parameter statistics calculation and quantization are performed in the quantization device 320, the neural network inferring apparatus 400 may perform parameter statistics calculation in the Lp norm calculating device 420 and perform parameter quantization in a quantization device 432 of the NPU 430.

The Lp norm calculating device 420 may acquire a parameter of a floating-point format stored in the first memory 410 and calculate or infer statistics of the parameter. For example, the Lp norm calculating device 420 may acquire a weight of a neural network stored in the first memory 410 and calculate an Lp norm of the weight. The Lp norm relates to a method of measuring a size of a vector, and may include an L1 norm and an L2 norm. The L2 norm may be calculated using Equation 2 below.

$$\|x\|_2 := \sqrt{x_1{}^2 + \ldots + x_n{}^2} \qquad \text{Equation 2:}$$

In Equation 2, $x_1$ through $x_n$ denote elements of a vector x and $\|x\|_2$ denotes an L2 norm of the vector x. However, in addition to the Lp Norm, another metric for measuring the size or length of a vector may be used depending on an example.

The NPU 430 may receive an Lp norm of parameters from the Lp norm calculating device 420, quantize floating-point format parameters to fixed-point format parameters based on the Lp norm of the parameters, and perform inference using a neural network generated in a neural network trainer using the quantized parameters.

A second memory 431 may store the Lp norm of the parameters received from the Lp norm calculating device 420. The quantization device 432 may determine a dynamic range of the parameters based on the Lp norm of the parameters received from the second memory 431 and quantize a floating-point format parameter to a fixed-point format parameter. A process of quantizing a floating-point format parameter to a fixed-point format parameter is described below in greater detail with reference to FIGS. 5 through 9. An ALU 433 may process a convolution operation between a quantized input activation and a weight and apply a convolution operation result to an activation function, thereby generating an output activation. In addition, the second memory 431 may store intermediate values calculated in a process of performing bit manipulation and integer arithmetic operations using the ALU 433.

Figure 5:
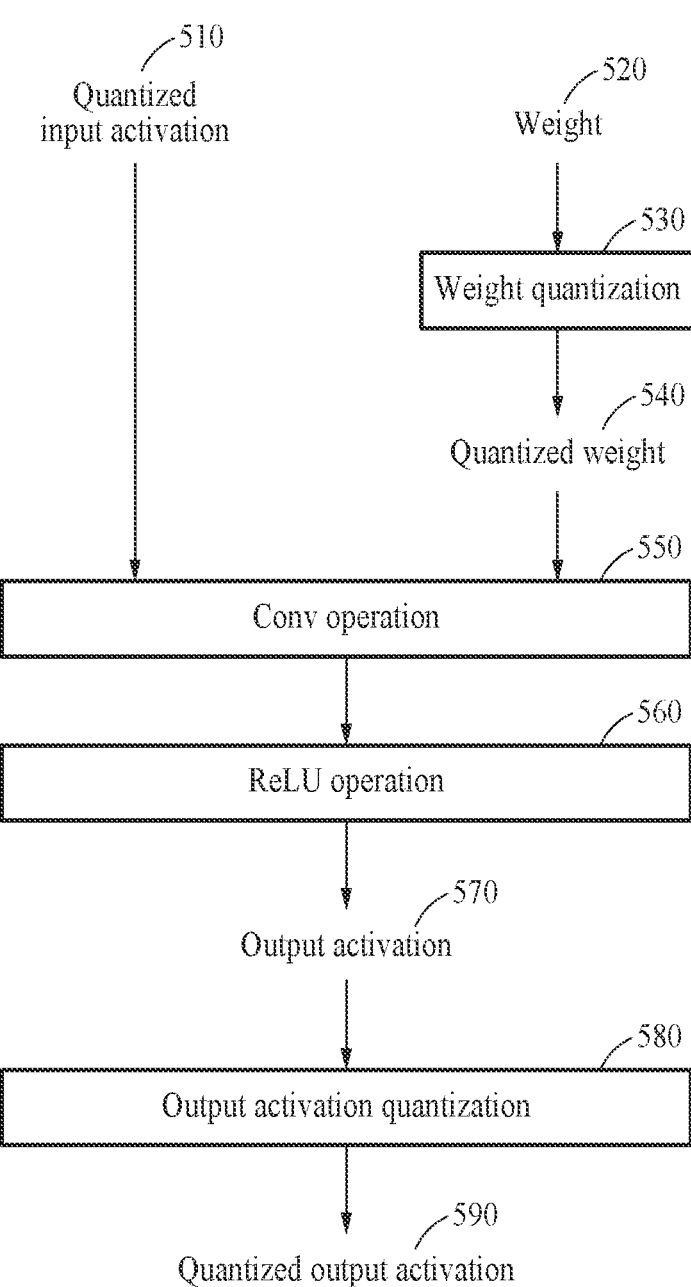
FIG. 5 is a diagram illustrating an example of a method of quantizing a weight and an activation.

FIG. 5 is a diagram illustrating an example of a method of quantizing a weight and an activation.

Referring to FIG. 5, a quantization device may quantize a weight and an activation. A neural network inferring apparatus may perform inference using a weight of a trained neural network stored in a first memory. Thus, the quantization device may quantize the weight offline in advance.

In contrast, an activation is determined after input data for inference is input to a neural network and the neural network is executed. Thus, the quantization device may not quantize the weight offline in advance. Instead, the quantization device may determine a dynamic range of the activation offline. The quantization device may determine a dynamic range of the output activation based on a relationship between an input activation and an output activation of layers configuring a neural network.

Referring to FIG. 5, a neural network inferring apparatus may output a quantized output activation 590 using a quantized weight 540 and an activation with a dynamic range determined.

In operation 530, the quantization device may quantize a weight 520 offline.

In operation 550, the neural network inferring apparatus may perform a convolution operation between a quantized input activation 510 and the quantized weight 540. If the parameter is quantized to 8 bits, the convolution operation may be an 8*8 operation. If data is quantized to 4 bits, the convolution operation may be a 4*4 operation.

In operation 560, the neural network inferring apparatus may output an output activation by performing an activation operation, for example, ReLU operation on a convolution operation result.

In operation 580, the neural network inferring apparatus may quantize an output activation based on a predetermined dynamic range of the output activation. For example, the neural network inferring apparatus may quantize the output activation 570 represented by 16 bits into a predetermined dynamic range of 8 bits of the output activation.

Figure 6:
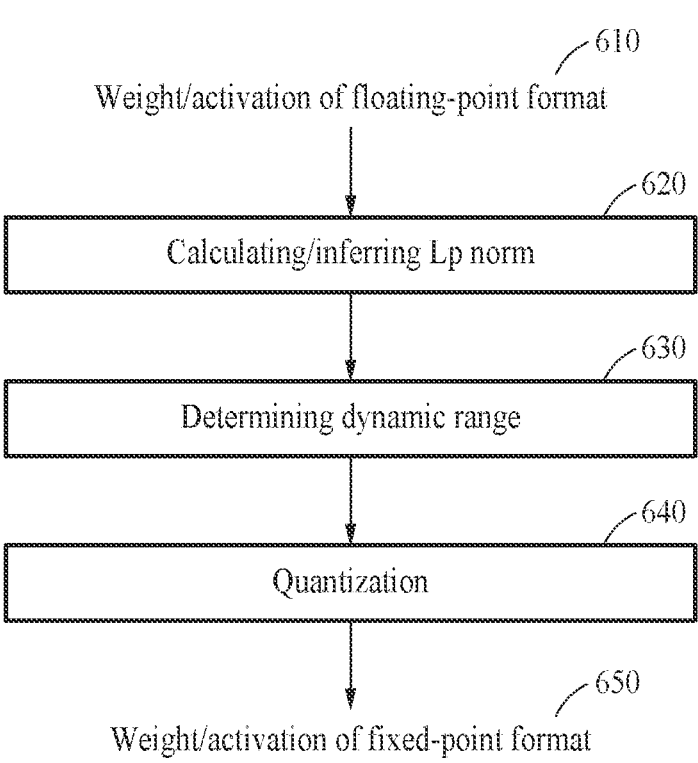
FIG. 6 is a diagram illustrating an example of a method of quantizing a parameter based on an Lp norm of the parameter.

FIG. 6 is a diagram illustrating an example of a method of quantizing a parameter based on an Lp norm of the parameter.

Referring to FIG. 6, a quantization device may quantize floating-point format weight and activation 610 to a fixed-point format weight and activation 650.

In operation 620, the quantization device may calculate an Lp norm of a weight and infer an Lp norm of an activation. Since the weight is determined in advance once training is completed, the quantization device may calculate the Lp norm of the weight. The activation is determined after input data for inference is input to a neural network and the neural network is executed. Thus, an accurate Lp norm of the activation may not be calculated. Instead, the quantization device may infer an Lp norm of an output activation based on a relationship between an input activation and an output activation of layers configuring a neural network. A method of inferring an Lp norm of an activation is described in greater detail with reference to FIG. 7.

In operation 630, the quantization device may determine a dynamic range of the parameter based on the calculated or inferred Lp norm of the parameter. The quantization device may determine a dynamic range of the parameter based on Equation 3 below.

$$\text{clip\_val}=k\times\|a\|_2 \qquad \text{Equation 3:}$$

In Equation 3, k denotes a preset constant (for example, assuming a Laplacian distribution, k≅7.89 or k≅714.33), $\|a\|_2$ denotes an Lp norm of a parameter a, and clip_val denotes a dynamic range of the parameter a.

In operation 640, the neural network inferring apparatus may output the fixed-point format weight and activation 650 by quantizing the floating-point format weight and activation.

Figure 7:
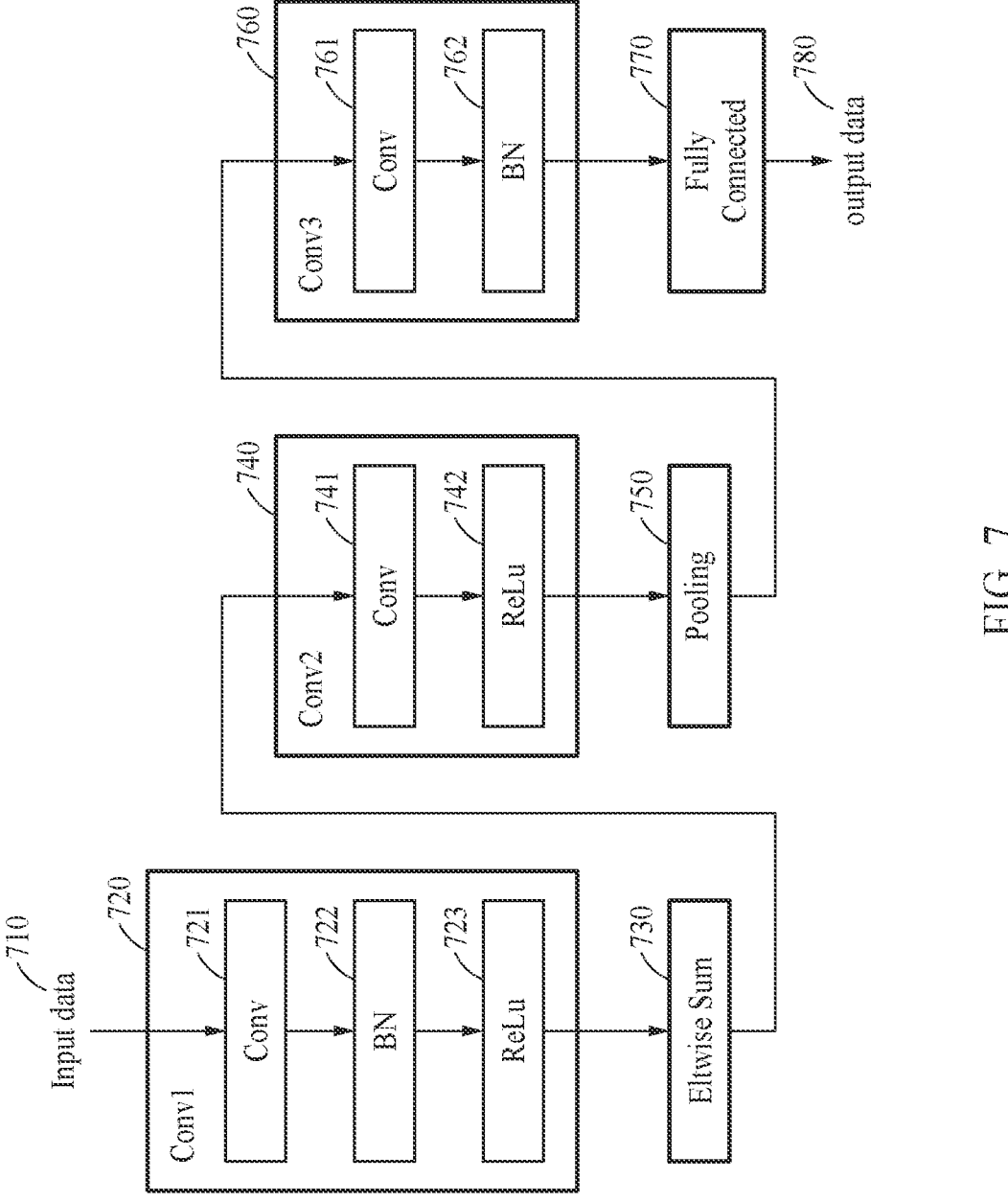
FIG. 7 is a diagram illustrating an example of quantizing a floating-point to a fixed-point in a neural network.

FIG. 7 is a diagram illustrating an example of quantizing a floating-point to a fixed-point in a neural network.

Referring to FIG. 7, the quantization device 320 may load a parameter of a floating-point format used in a process of inferring by a neural network from the first memory 310. For example, the quantization device 320 may load a weight of a first convolutional layer 720, a weight of a second convolutional layer 740, a weight of a third convolutional layer 760, and data associated with a relationship between an Lp norm of an input activation and an Lp norm of an output activation of each of layers 720, 730, 740, 750, 760, and 770.

The quantization device 320 may quantize the weight of the first convolutional layer 720, the weight of the second convolutional layer 740, and the weight of the third convolutional layer 760. For example, the quantization device 320 may calculate Lp norms of the weight of the first convolutional layer 720, the weight of the second convolutional layer 740, and the weight of the third convolutional layer 760 represented by 32 bits, and quantize each of the weights into 8 bits by determining a dynamic range of the corresponding weight. As described above, the quantization device 320 may perform quantization of the weight offline.

The quantization device 320 may predict an Lp norm of an output activation of a convolutional layer including a normalization layer according to Equation 4 below.

$$\|out\|_2 \cong \sqrt{a^2+b^2} \qquad \text{Equation 4:}$$

In Equation 4, $\|out\|_2$ denotes an Lp norm of an output activation, a denotes a scale parameter of a normalization layer, and b denotes a shift parameter of the normalization layer.

Since the first convolutional layer 720 and the third convolutional layer 760 include a normalization layer 722 and a normalization layer 762, respectively, the quantization device 320 may predict Lp norms of output activations of the first convolutional layer 720 and the third convolutional layer 760 based on normalization parameters of the normalization layer 722 and the normalization layer 762.

Hereinafter, a layer including a normalization layer is referred to as a first layer, and a layer that does not include a normalization layer is referred to as a second layer. As described above, the first layer may infer an Lp norm of an output activation according to Equation 4.

The quantization device 320 may infer an Lp norm of an output activation of the second layer based on an Lp norm of an output activation of the first layer and a relational expression between an Lp norm of an input activation and the Lp norm of the output activation of the second layer.

The relational expression between the Lp norm of the input activation and the Lp norm of the output activation may be determined based on a type of a layer. For example, relational expressions between Lp norms of input activations and Lp norms of output activations of a fully connected layer, an elementwise sum layer, a concatenate layer, and a convolutional layer may be Equation 5, Equation 6, Equation 7, and Equation 8 below.

$$|O|_2 \leq |I|_2 * \max\left\{\sum_{nn}\right\} \qquad \text{Equation 5}$$

$$\|A\|_2 = \sum \|A_i\|_2 \qquad \text{Equation 6}$$

-continued $$\|A\|_2 = \frac{\sum N_i \|A_i\|_2}{\sum N_i} \qquad \text{Equation 7}$$

$$\|O\|_2 = E[o^2]^{1/2} = \sum E[w_i^2]^{1/2} E[a_i^2]^{1/2} = k_w k_h \|w\|_2 \|a\|_2 \qquad \text{Equation 8}$$

In Equation 5, an L2 norm $|O|_2$ of an output vector of the fully connected layer may be bound by a product of a largest singular value $\max\{\Sigma_{nn}\}$ of a weight and an L2 norm $|I|_2$ of an input vector.

In a case of the elementwise sum layer, $A=\Sigma A_i$. Also, in the case of the elementwise sum layer, Equation 6 may be derived under an assumption that elements are independent.

In Equation 7, $N_i$ denotes a number of parameters of input tensors, $\|A\|_2$ denotes an L2 norm of an output tensor, and $\Sigma N_i \|A_i\|_2$ denotes a weighted sum of the input tensors.

In Equation 8 $k_w$ and $k_h$ denote a width and a height of a kernel, and $\|w\|_2$ denotes an L2 norm of a weight.

The quantization device 320 may load the relational expression of the second layer from the first memory 310. The Lp norm of the output activation of the first convolutional layer 720 may be the same as an Lp norm of an input activation of an elementwise sum layer 730. Thus, the quantization device 320 may infer the Lp norm of the elementwise sum layer 730 based on the Lp norm of the output activation of the first convolutional layer 720 and a relationship expression (e.g., Equation 6) between the Lp norm of the input activation and the Lp norm of the output activation of the elementwise sum layer 730.

Likewise, the Lp norm of the output activation of the elementwise sum layer 730 may be the same as the Lp norm of the input activation of the second convolutional layer 740. Thus, the quantization device 320 may infer the Lp norm of the second convolutional layer 740 based on the Lp norm of the output activation of the elementwise sum layer 730 and a relational expression (e.g., Equation 8) between the Lp norm of the input activation and the Lp norm of the output activation of the second convolutional layer 740.

In addition, since a pooling layer 750 does not cause a change of an Lp norm, the Lp norm of the output activation of the second convolutional layer 740 may be the same as the Lp norm of the input activation of the third convolutional layer 760. Thus, the quantization device 320 may infer the Lp norm of the third convolutional layer 760 based on the Lp norm of the output activation of the second convolutional layer 740 and a relational expression (e.g., Equation 8) between the Lp norm of the input activation and the Lp norm of the output activation of the third convolutional layer 760.

Likewise, the Lp norm of the output activation of the third convolutional layer 760 may be the same as an Lp norm of an input activation of a fully connected layer 770. Thus, the quantization device 320 may infer the Lp norm of the fully connected layer 770 based on the Lp norm of the output activation of the third convolutional layer 760 and a relational expression (e.g., Equation 5) between the Lp norm of the input activation and an Lp norm of an output activation of the fully connected layer 770.

If the first layer is absent in the neural network, the quantization device 320 may measure an Lp norm of an input activation of a first ordered layer. The quantization device 320 may infer an Lp norm of an output activation of subsequent layers using a relational expression and the Lp norm of the input activation of the first ordered layer.

The quantization device 320 acquiring the Lp norm of the activation and the weight of the floating-point format used in the process of inferring by the neural network may determine dynamic ranges of the activation and the weight. Furthermore, the quantization device 320 may perform quantization of a weight that is aware of data of the floating-point format. The dynamic range of the activation and the quantized weight may be stored in the second memory 331 of the NPU 330.

The quantization device 320 may receive input data 710 for inference in the neural network and quantize the received input data 710. The ALU 332 of the NPU 330 may perform a neural network operation using the quantized input data, the dynamic range of the activation, and the quantized weight.

In another example, the Lp norm calculating device 420 may perform Lp norm calculation and inference operations of the quantization device 320, and repeated description will be omitted. The dynamic range of the activation and the dynamic range of the weight may be stored in the second memory 431 of the NPU 430. The quantization device 432 of the NPU 430 may perform quantization of the weight and the input data 710. The ALU 332 of the NPU 330 may perform a neural network operation using the quantized input data, the dynamic range of the activation, and the quantized weight.

FIG. 8 is a flowchart illustrating an example of a quantization method.

Referring to FIG. 8, operations 810 through 840 may be performed by the quantization device 320 described with reference to FIG. 3. The quantization device 320 may be implemented by one or more hardware modules, one or more software modules, or various combinations thereof.

In operation 810, the quantization device 320 acquires a parameter of a floating-point format used in a process of inferring by a neural network. In operation 820, the quantization device 320 quantizes, based on statistics of a weight included in the parameter, the weight into a fixed-point format. In operation 830, the quantization device 320 determines, based on statistics of an activation of one or more layers configuring the neural network included in the parameter, a dynamic range of the activation. In operation 840, the quantization device 320 quantizes, based on statistics of input data of the neural network, the input data into a fixed-point format. In addition, the description of FIGS. 1 through 7 may apply in relation to the quantization method.

Figure 9:
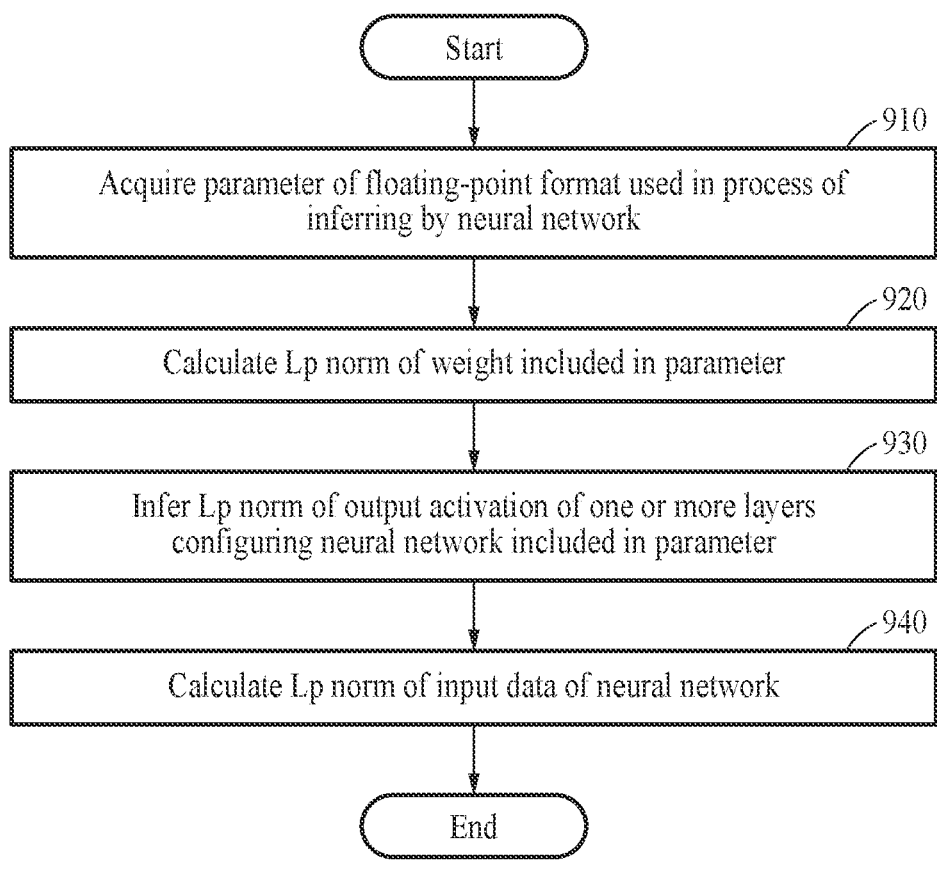
FIG. 9 is a flowchart illustrating another example of a quantization method.

FIG. 9 is a flowchart illustrating another example of a quantization method.

Referring to FIG. 9, operations 910 through 940 may be performed by the Lp norm calculating device 420 described with reference to FIG. 4. The Lp norm calculating device 420 may be implemented by one or more hardware modules, one or more software modules, or various combinations thereof.

In operation 910, the Lp norm calculating device 420 acquires a parameter of a floating-point format used in a process of inferring by a neural network. In operation 920, the Lp norm calculating device 420 calculates an Lp norm of a weight included in the parameter. In operation 930, the Lp norm calculating device 420 infers an Lp norm of an output activation of one or more layers configuring the neural network included in the parameter. In operation 940, the Lp norm calculating device 420 calculates an Lp norm of input data of the neural network. In addition, the description of FIGS. 1 through 7 may apply in relation to the quantization method.

The apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A computer-implemented method of quantizing parameters of a neural network, the method comprising:

acquiring, from a first memory, a parameter of a floating-point format used in a process of inferring by the neural network;

quantizing, by a quantization device, based on statistics of a weight included in the parameter, the weight into a fixed-point format;

determining, based on statistics of an activation of one or more layers configuring the neural network included in the parameter, a dynamic range of the activation, wherein the determining of the dynamic range of the activation comprises:

calculating a relational expression between an Lp norm of an output activation and an Lp norm of an input activation of the one or more layers based on the parameter; and inferring an Lp norm of an output activation of the one or more layers based on the relational expression and an Lp norm of an output activation of a previous layer of the one or more layers;

quantizing, by the quantization device, based on statistics of input data of the neural network, the input data into a fixed-point format;

inputting, to the neural network, the quantized input data stored in a second memory;

performing, by a NPU, an operation between a quantized input activation of a current layer of the neural network and a quantized weight of the current layer and generating an output activation of the current layer; and quantizing the output activation of the current layer based on the dynamic range of the activation, into the fixed-point format.

2. The method of claim 1, wherein the quantizing of the weight into the fixed-point format comprises:

calculating an Lp norm of the weight;

determining a dynamic range of the weight based on the Lp norm of the weight; and quantizing the weight into the fixed-point format based on the dynamic range of the weight.

3. The method of claim 1, wherein the determining of the dynamic range of the activation comprises: determining a dynamic range of the output activation of the one or more layers based on the Lp norm of the output activation of the one or more layers.

4. The method of claim 1, wherein the determining of the dynamic range of the activation comprises:

classifying the one or more layers into a first layer comprising a normalization layer and a second layer that does not comprise the normalization layer;

inferring an Lp norm of an output activation of the first layer based on a normalization parameter of the first layer included in the parameter; and inferring an Lp norm of an output activation of the second layer based on the parameter and the Lp norm of the output activation of the first layer.

5. The method of claim 4, wherein the inferring of the Lp norm of the output activation of the second layer comprises:

calculating a relational expression between an Lp norm of an input activation and an Lp norm of the output activation of the second layer based on the parameter;

determining the Lp norm of the input activation of the second layer based on the Lp norm of the output activation of the first layer; and inferring the Lp norm of the output activation of the second layer based on the Lp norm of the input activation of the second layer and the relational expression.

6. The method of claim 4, wherein the determining of the dynamic range of the activation comprises:

determining a dynamic range of the output activation of the first layer based on the Lp norm of the output activation of the first layer; and determining a dynamic range of the output activation of the second layer based on the Lp norm of the output activation of the second layer.

7. A neural network quantization apparatus for quantizing parameters of a neural network, the apparatus comprising:

a first memory:

a second memory; and a processor configured to:

acquire, from the first memory, a parameter of a floating-point format used in a process of inferring by the neural network, quantize, based on statistics of a weight included in the parameter, the weight into a fixed-point format, determine, based on statistics of an activation of one or more layers configuring the neural network included in the parameter, a dynamic range of the activation, wherein the processor is configured to:

calculate a relational expression between an Lp norm of an output activation and an Lp norm of an input activation of the one or more layers based on the parameter, and infer an Lp norm of an output activation of the one or more layers based on the relational expression and an Lp norm of an output activation of a previous layer of the one or more layers, quantize, based on statistics of input data of the neural network, the input data into a fixed-point format;

input, to the neural network, the quantized input data stored in the second memory;

perform an operation between a quantized input activation of a current layer of the neural network and a quantized weight of the current layer and generating an output activation of the current layer; and quantize the output activation of the current layer, based on the dynamic range of the activation, into the fixed-point format.

8. The neural network quantization apparatus of claim 7, wherein the processor is configured to:

calculate an Lp norm of the weight, determine a dynamic range of the weight based on the Lp norm of the weight, and quantize the weight into the fixed-point format based on the dynamic range of the weight.

9. The neural network quantization apparatus of claim 7, wherein the processor is configured to determine a dynamic range of the output activation of the one or more layers based on the Lp norm of the output activation of the one or more layers.

10. The neural network quantization apparatus of claim 7, wherein the processor is configured to:

classify the one or more layers into a first layer comprising a normalization layer and a second layer that does not comprise the normalization layer, infer an Lp norm of an output activation of the first layer based on a normalization parameter of the first layer included in the parameter, and infer an Lp norm of an output activation of the second layer based on the parameter and the Lp norm of the output activation of the first layer.

11. The neural network quantization apparatus of claim 10, wherein the processor is configured to:

calculate a relational expression between an Lp norm of an input activation and an Lp norm of the output activation of the second layer based on the parameter, determine the Lp norm of the input activation of the second layer based on the Lp norm of the output activation of the first layer, and infer an Lp norm of the output activation of the second layer based on the Lp norm of the input activation of the second layer and the relational expression.

12. The neural network quantization apparatus of claim 10, wherein the processor is configured to:

determine a dynamic range of the output activation of the first layer based on the Lp norm of the output activation of the first layer, and determine a dynamic range of the output activation of the second layer based on the Lp norm of the output activation of the second layer.

13. A neural processing unit (NPU) comprising:

a memory comprising an Lp norm of a weight, an Lp norm of an output activation of layers, and an Lp norm of input data; and a neural network quantization apparatus configured to:

determine a dynamic range of the weight based on the Lp norm of the weight, quantize the weight into a fixed-point format based on the dynamic range of the weight;

determine a dynamic range of the output activation of the layers based on the Lp norm of the output activation of the layers, wherein the determining of the dynamic range of the activation comprises:

calculating a relational expression between an Lp norm of an output activation and an Lp norm of an input activation of the one or more layers based on the parameter; and inferring an Lp norm of an output activation of the one or more layers based on the relational expression and an Lp norm of an output activation of a previous layer of the one or more layers;

determine a dynamic range of the input data based on the Lp norm of the input data;

quantize the input data into a fixed-point format based on the dynamic range of the input data; and an arithmetic logic unit (ALU) configured to perform an operation between a quantized input activation of a current layer of the neural network and a quantized weight of the current layer and generate an output activation of the current layer, wherein the neural network quantization apparatus is configured to quantize the output activation of the current layer based on the dynamic range of the output activation.

* * * * *